United States Patent
Ottenheijm

(10) Patent No.: US 7,572,856 B2
(45) Date of Patent: *Aug. 11, 2009

(54) PROCESS FOR PREPARING A FLAME RETARDANT POLYAMIDE COMPOUND

(75) Inventor: Johannes H. G. Ottenheijm, Born (NL)

(73) Assignee: DSM IP Assets B.V., Heerlen (NL)

( * ) Notice: Subject to any disclaimer, the term of this patent is extended or adjusted under 35 U.S.C. 154(b) by 442 days.

This patent is subject to a terminal disclaimer.

(21) Appl. No.: 10/537,991

(22) PCT Filed: Dec. 10, 2003

(86) PCT No.: PCT/NL03/00873

§ 371 (c)(1), (2), (4) Date: Oct. 11, 2005

(87) PCT Pub. No.: WO2004/055109

PCT Pub. Date: Jul. 1, 2004

(65) Prior Publication Data

US 2006/0052528 A1    Mar. 9, 2006

(30) Foreign Application Priority Data

Dec. 16, 2002  (EP) .................................. 02080263

(51) Int. Cl.
*C08L 77/00* (2006.01)
(52) U.S. Cl. ...................................... 524/538; 525/420
(58) Field of Classification Search ................. 524/538; 525/420
See application file for complete search history.

(56) References Cited

U.S. PATENT DOCUMENTS

| 4,788,244 | A | * | 11/1988 | Nakahashi et al. | 524/469 |
| 5,115,010 | A | * | 5/1992 | Sakai et al. | 524/410 |
| 5,618,865 | A | * | 4/1997 | Martens et al. | 524/100 |
| 6,025,419 | A | * | 2/2000 | Kasowski et al. | 524/100 |
| 6,166,114 | A | * | 12/2000 | Cosstick et al. | 524/100 |
| 6,258,927 | B1 | * | 7/2001 | Oka et al. | 528/310 |
| 6,350,802 | B1 | * | 2/2002 | Martens et al. | 524/409 |
| 6,548,591 | B2 | * | 4/2003 | Koning et al. | 524/494 |
| 2002/0193494 | A1 | * | 12/2002 | Gilmer et al. | 524/445 |

FOREIGN PATENT DOCUMENTS

WO     WO 00/75233     12/2000

OTHER PUBLICATIONS

Database WPI Section Ch, Week 199338, XP002244640 and JP 05 214246, Aug. 24, 1993.
International Search Report.

* cited by examiner

*Primary Examiner*—Peter Szekely
(74) *Attorney, Agent, or Firm*—Nixon & Vanderhye P.C.

(57) ABSTRACT

The invention relates to a process for preparing a flame retardant polyamide compound comprising melt-mixing of a composition comprising at least a polyamide polymer having a weight-average molecular weight of at least 10.000 g/mol, an amount of 1-100 wt. % relative to the total weight of polyamide of a flame retardant, and an amount of 0.1-30 wt. %, relative to the total weight of polyamide, of a polyamide oligomer having a weight-average molecular weight of at most 7.500 g/mol.

10 Claims, No Drawings

PROCESS FOR PREPARING A FLAME RETARDANT POLYAMIDE COMPOUND

This application is the US national phase of international application PCT/NL2003/000873 filed 10 Dec. 2003 which designated the U.S. and claims benefit of EP 02080263.3, dated 16 Dec. 2002, the entire content of which is hereby incorporated by reference.

The present invention relates to a process for preparing a flame retardant polyamide compound comprising melt-mixing of a composition comprising at least a polyamide polymer having a weight-average molecular weight of at least 10.000 g/mol and a flame retardant.

Such a process is known from EP-0794976-B1. This patent describes flame retardant polyamide compounds comprising different components including a polyamide and a flame retardant, which compounds can be prepared by a process wherein the components are dry-blended and consequently fed into a melt-mixing apparatus, for instance an extruder. As the flame retardants organic halogen-free flame retardants are mentioned, more particular the triazine compounds melamine and melamine cyanurate. Melamine and melamine cyanurate have found widespread application in flame retardant plastic compounds. These compounds have the practical advantages that already at relatively low concentration adequate flame retardancy can be obtained without the use of synergists, no discoloration of the compound occurs under normal conditions and no corrosion of the processing apparatus is observed. In the cited patent it is reported that the flame retarding effect of triazine compounds is thought to originate from the decomposition of these compounds at heating into nitrogen containing gaseous compounds that act as flame extinguishers.

In the same patent, it is mentioned that melamine, and to a lesser extent melamine cyanurate, have the disadvantage that during processing melamine is deposited in the mould, which may cause obstruction of ventilation ducts and makes regular stops of the production process necessary to clean the mould. Although melamine cyanurate shows this disadvantageous phenomenon of mould deposit to a lesser extend than melamine, its use is further limited due to the fact that at higher temperatures, for instance at temperatures higher than 270° C., polyamide melts containing melamine cyanurate are unstable and show a decrease in melt viscosity. At temperatures of 290° C. and higher in many cases gas evolution is so high that processing of compounds with melamine cyanurate is practically impossible.

This problem of limited stability at elevated temperature is also met with other halogen-free flame-retardants, such as melamine polyphosphates. The limited temperature stability of the halogen-free flame retardants raises problems in the preparation of flame retardant polyamide compounds in the class of high temperature engineering polyamides via a melt-mixing process, resulting in degradation of the flame retardant and in polyamide compounds having a lower flame retardancy than could be expected on the basis of the content of flame retardant in the compounds. These phenomena are in particular observed with glass fiber reinforced polyamides.

Therefore, in high temperature engineering polyamides, for instance polyamide-6,6, (melting temperature 265° C.), polyamide-4,6, (melting temperature 290° C.), semi-aromatic polyamides, with even higher melting temperatures, and the copolyamides thereof (for instance PA-6,6/6,T/6,I), melamine and melamine cyanurate cannot be used and one has to rely on the halogenated organic compounds, for instance brominated polystyrene, to impart flame retardant properties to these polyamides. However, these halogenated flame retardant compounds are also heat sensitive in the sense that compounds with these flame retardants usually are discolored or give rise to corrosion of processing equipment. These problems are further emphasized in glass fiber reinforced compounds based on high temperature engineering polyamides and halogenated flame retardant.

As a solution to these problems, EP-0794976-B1 claims polyamide compounds comprising melam as the flame retardant and the possible preparation of these compounds via a melt-mixing process.

The object of the present invention is to provide a melt-mixing process, which allows preparation of a flame retardant polyamide compound comprising a heat sensitive halogen-free flame retardant and/or a halogenated flame retardant in combination with high temperature engineering polyamides as the polyamide, which compound shows improved flame retardancy properties and/or improved color compared to the known compounds.

This object is achieved with the process wherein the composition that is melt-mixed comprises an amount of 0.1-30 wt. %, relative to the total weight of polyamide, of a polyamide oligomer having a weight-average molecular weight of at most 7.500 g/mol, with the proviso that the composition that is melt-mixed does not consist of:

i) 100 parts by weight of a polyamide polymer, 0.001-10 parts by weight of a polyamide oligomer with a molecular weight of 5000 or less and having hydrocarbon radicals with 5-30 carbons as the terminals, and 1-25 parts by weight of a triazine flame retardant;

ii) 100 parts by weight of a polyamide-6,6 polymer, 15 parts by weight of a polyamide oligomer with a molecular weight of 1000 and consisting of the condensation product of stearic acid, ethylenediamine, and sebacic acid, and 7 parts by weight of melamine cyanuric acid; or iii) 100 parts by weight of a polyamide-6 polymer, 0.5 parts by weight of polyamide oligomer with a molecular weight of 1200 and consisting of the condensation product of stearyl amine, ethylenediamine, and sebacic acid, and 27 parts by weight of melamine cyanuric acid.

With the process according to the invention, using an organic halogen-free flame retardant as the flame retardant, polyamide compounds with a lower total burning time in flame retardancy tests, compared to the compounds per the prior art, can be prepared. The compounds also show, as an additional advantage, improved mechanical properties. With the process according to the invention, wherein the flame retardant is a halogenated organic compound, a polyamide compound with reduced discoloration can be prepared. Furthermore, these compounds show a good strand quality upon extrusion of the melt after mixing, even when the process is carried out at higher screw speed.

JP-5214246-A (Toray, 1992) describes a polyamide compound wherein 0.001-10 parts by weight of a polyamide oligomer with a molecular weight of 5000 or less and modified with hydrocarbon radicals with 5-30 carbon atoms as terminals groups, and 1-25 parts by weight of a triazine flame retardant have been melt-mixed with 100 parts by weight of a polyamide polymer. With this compound, the Japanese patent application aims at a solution for the problem of flame resistance decline, which occurs by addition of a mould-separating agent. The described polyamide compound is claimed to have flame resistant and mould release properties. JP-5214246-A does not relate to the problem of, or a solution for, instability of flame retardants at elevated temperatures occurring during melt-mixing of a composition comprising at least a polyamide and a flame retardant. More particularly, to avoid similar problems during molding, JP-5214246-A teaches to limit the amount of flame retardant to 25 weight parts, more preferably 20 weight parts and even more preferably 15 weight parts, relative to 100 weight parts polyamide polymer, because when the rate of flame retardant exceeds the higher limit gas is produced at the time of moulding, and the outer appearance of the moulded product is damaged and mechanical properties decline. JP-5214246-A also teaches to limit the amount of polyamide oligomer to 10 weight parts, because when the rate of polyamide oligomer exceeds 10 weight parts, gas is produced at the time of moulding, and the outer appearance of the moulded product is damaged and mechanical properties decline.

JP-5214246-A furthermore reports, as comparative examples, melt-mixing of a composition consisting of 100 parts JP-5214246-A by weight of a polyamide-6,6 polymer, 15 parts by weight of a polyamide oligomer with a molecular weight of 1000 and consisting of the condensation product of stearic acid, ethylenediamine, and sebacic acid, and 7 parts by weight of melamine cyanuric acid; and a composition consisting of 100 parts by weight of a polyamide-6 polymer, 0.5 parts by weight of polyamide oligomer with a molecular weight of 1200 and consisting of the condensation product of stearyl amine, ethylenediamine, and sebacic acid, and 27 parts by weight melamine cyanuric acid. JP-5214246-A does not report the advantageous features of our invention for these two comparative examples.

The compositions which are melt-mixed in the claimed process according to JP-5214246-A, as well as the above two comparative examples mentioned therein, accidentally fall in the range of the invention and are disclaimed.

With the process according to the invention, compositions comprising a polyamide polymer, a flame retardant and an oligomer with a molecular weight of 5000 or less and modified with hydrocarbon radicals with 5-30 carbon atoms as terminals groups can be melt-mixed and still giving products with a good outer appearance and/or with improved mechanical properties when the amount of flame retardant is higher than 25 parts by weight and/or the amount of polyamide oligomer is higher than 10 parts by weight, the amounts relative to 100 parts by weight of the polyamide polymer. The same good results are obtained when the molecular weight of the polyamide oligomer is above 5000.

In the context of the present invention, a polyamide compound is understood to be a polyamide composition that is obtainable by melt-mixing of the constituting components of the polyamide composition and is suitable for being used in a moulding process for preparing a shaped article. The polyamide compound may have different forms, for example, but not limited thereto, a melt (for example in an apparatus suitable for preparing moulded parts), extruded strands, chopped granules, and molded parts (for example when the polyamide composition after being melt-mixed is directly shaped into a moulded part).

With a polyamide composition is understood the total of ingredients or constituents, which can be used for preparing a polyamide compound. The polyamide composition may have the form of a dry blend. The composition may also be formed by separately adding the respective constituents or combinations thereof, to an apparatus suitable for preparing said polyamide compound.

In the context of the present invention a polyamide polymer is understood to be a high-molecular polyamide with a weight-average molecular weight of at least 10.000 g/mol, preferably at least 15.000 g/mol, more preferably at least 20.000 g/mol.

The polyamide oligomer is herein understood to be a low-molecular polyamide with a weight-average molecular weight of at most 7500. Preferably, the weight-average molecular weight is lower than the "molecular weight between entanglements" of the high-molecular polymer. This "molecular weight between entanglements" is for example 5.000 g/mol in the case of PA-6. Also preferably the weight average molecular weight of the polyamide oligomer is at most 5.000 g/mol, more preferably at most 4.000 g/mol, even more preferably at most 3.000 g/mol. The molecular weight of the polyamide oligomer may not be too low either, to avoid the risk of for example the glass transition temperature being lowered. Preferably the weight-average molecular weight is greater than approximately 1.000 g/mol.

Suitable polyamides, for both the polyamide polymer and the polyamide oligomer, are all the polyamides known to a person skilled in the art, comprising crystalline, semi-crystalline and amorphous polyamides, that are melt-processable. Examples of suitable polyamides according to the invention are aliphatic polyamides, for example PA-6, PA-11, PA-12, PA4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6, 10-copolyamide, PA-6,6/6, 10-copolyamide, PA-4,6/6-copolyamide, PA-6/6, 6/6, 10-terpolyamide, and copolyamides obtained from 1,4-cyclohexanedicarboxylic acid and 2,2,4- and 2,4,4-trimethylhexamethylenediamine, aromatic polyamides, for example PA-6,I, PA-6,I/6,6-copolyamide, PA-6,T, PA-6,T/6-copolyamide, PA-6,T/6,6-copolyamide, PA-6,I/6,T-copolyamide, PA-6,6/6,T/6,I-copolyamide, PA-6,T/2-MPMDT-copolyamide (MPMDT=2-methylpentamethylene diamine), PA-9,T, copolyamides obtained from terephthalic acid, 2,2,4- and 2,4,4-trimethylhexamethylenediamine, copolyamide obtained from isophthalic acid, laurinlactam and 3,5-dimethyl-4,4-diamino-dicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexyl-methane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl—substituted hexamethylenediamine and alkyl-substituted 4,4-diaminodicyclohexylamine, and also copolyamides and mixtures of the aforementioned polyamides.

Preferably polyamides are chosen from the group comprising PA-6, PA-6,6, PA-6,10, PA-4,6, PA-11, PA-12, PA-12,12, PA-6,I, PA-6,T, PA-6,T/6,6-copolyamide, PA-6,T/6-copolyamide, PA-6/6,6-copolyamide, PA-6,6/6,T/6,I-copolyamide, PA-6,T/2-MPMDT-copolyamide, PA-9,T, PA-4,6/6-copolyamide and mixtures and copolyamides of the aforementioned polyamides. More preferably PA-6,I, PA-6,T, PA-6,6, PA-6,6/6T, PA-6,6/6,T/6,I-copolyamide, PA-6,T/2-MPMDT-copolyamide, PA-9,T or PA-4,6, or a mixture or copolyamide thereof, is chosen as the polyamide.

The low molecular weight polyamide oligomer may be chosen to have the same composition as the high molecular weight polyamide; the two polyamides, i.e. the oligomer and the polymer, may also be chosen to have different compositions.

The high molecular weight polyamide polymer in the process according to the invention may optionally contain modified end groups, for example amine end groups modified with a mono-carbooxylic acid and/or carboxylic acid end groups modified with a mono-functional amine. Modified end-groups in the high molecular weight polyamide polymer may advantageously be applied for improved melt-stability of the composition during preparation of the compound by melt-mixing and for improved melt-stability of the compound during moulding of said compound for preparing a moulded part.

Preferably, the polyamide polymer is a high temperature engineering polyamide, defined by a melting temperature of at least 260° C. More preferable, the melting temperature is at least 270° C., even more preferable at least 280° C. and most preferably at least 290° C. The higher the melting temperature of the polyamide polymer, the more pronounced the effect of addition of the polyamide oligomer in the melt-mixing process is in the properties of the compound formed.

The polyamide oligomer preferably has a melting temperature of at most 20° C. above, more preferable at most 10° C. above, and even more preferable at most equal to the melting temperature of the polyamide polymer. The advantage of a polyamide oligomer with a melting temperature that does not exceed the melting temperature of the polyamide polymer too much or even better with a melting temperature that does not exceed the melting temperature of the polyamide polymer at all, is that the processing temperature necessary for the melt-mixing process can be kept as low as or can even be reduced compared to the process without polyamide oligomer and further reduces the effects of degradation of the flame retardant.

The polyamide oligomer preferably has a melting temperature of at least 260° C., more preferable at least 270° C., even more preferable at least 280° C. The advantage of a polyamide oligomer with a higher melting temperature, in particular when used in a larger amount, is that the high temperature mechanical properties of the polyamide compound are better retained or even improved.

A polyamide that is eminently suited for the polyamide oligomer in the process according to the invention is polyamide-4,6. Polyamide-4,6 oligomer has a melting temperature of about 290° C. The advantage of polyamide-4,6 oligomer is that it can be produced on industrial scale and that it can be combined with a wide range of high temperature engineering polyamides.

In the context of this application "PA-4,6" is understood to be a polyamide of which at least 50%, preferably at least 75%, more preferably at least 90%, consists of tetramethyleneadipamide units. PA-4,6 can be prepared through polycondensation of tetramethylenediamine and adipic acid or an adduct thereof, optionally in the presence of other polyamide-forming monomers, for example ε-caprolactam, a different diamine, for example hexamethylenediamine or a different carboxylic acid, for example isophthalic acid or cyclohexanedicarboxylic acid.

The polyamide oligomer in the process according to the invention may optionally contain modified end groups, for example amine end groups modified with a mono-functional carboxylic acid and/or carboxylic acid end groups modified with a mono-functional amine. Mono-functional carboxylic acids and/or mono-functional amines may advantageously be applied during the preparation of the polyamide oligomer as a chain stopper to control the molecular weight of the polyamide oligomer. Preferably, the polyamide oligomer comprises at most 50%, more preferably at most 25%, modified end groups relative to the total number of end groups. The advantage of a polyamide oligomer with at most 25% modified end groups in the process according to the invention is that the mechanical properties of the resulting compound, when comprising a halogen free flame retardant, are further improved.

The composition that is melt-mixed in the process according to the invention comprises 0.5-30 wt. % oligomer, relative to the total amount of polyamide. A person skilled in the art can choose the amount of oligomer within the given range, depending on the desired properties of the compound. Larger amounts of the oligomer can be used and may even result in a better performance of the flame retardant, however, too large amounts may adversely affect the mechanical properties. Preferably an amount of 1-20 wt. % oligomer, relative to the total amount of polyamide, more preferably 2-15 wt. % oligomer is chosen.

Suitable flame retardants that can be used in the process according to the invention, are halogen-free flame retardants as well as halogen containing flame retardants.

In a preferred mode of the process according to the invention, the composition that is melt-mixed comprises a halogen-free flame retardant as the flame retardant. With this process polyamide compounds with lower total burning times in flame retardancy tests can be prepared than with the same flame retardants in a process without a polyamide oligomer. The resulting compounds also show, as an additional advantage, improved mechanical properties.

Suitable halogen-free flame retardants are:
metal-containing compounds such as magnesium hydroxide and aluminium hydroxide;
nitrogen-containing compounds such as guanamine based compounds and melamine based compounds;
nitrogen and phosphorus containing compounds such as ammonium polyphosphate and melamine based phosphorous compounds.
phosphorus-containing compounds such as red phosphorus, phosphazene-based compounds and organic phosphorus compounds Suitable melamine based compounds that can be chosen as the nitrogen containing compound are for example melamine, melamine derivatives, melamine condensation products and mixtures thereof. In the context of this application a "melamine derivative" is understood to be melamine with one or more amine groups having been substituted with one or more alkyl, aryl, aralkyl or cycloalkyl groups, for example to be chosen from the group comprising methyl, ethyl, ethenyl, phenyl or toluyl. Examples of such melamine derivatives are N,N',N"-triphenylmelamine. Another example of a melamine derivative is melamine cyanurate. In the context of this application a "melamine condensation product" is understood to be a compound in which two or more melamine compounds are connected to one another, for example melam, melem, melon and higher oligomers and menthone, which condensation products can for example be obtained using the process described in WO 96/16948.

Preferably, the nitrogen-containing compound is melamine, melamine cyanurate, melam, melem and melon or mixtures thereof are chosen. The advantage is that further processing of the polyamide compounds is easier and that deposition of volatile components in the mould is reduced.

Suitable melamine-phosphorus compounds that can be used as the flame retardant in the present invention are, for example, melamine phosphates, like melamine phosphate, melamine pyrophosphate and melamine polyphosphate, for example Melapur® 200 (DSM, the Netherlands) and PMP-100® (Nissan Chemical Industries, Japan), and phosphates of melamine condensation products, like melam polyphosphate, for example PMP-200® (Nissan Chemical Industries), and melem polyphosphate, for example PMP-300® (Nissan Chemical Industries), Suitable organic phosphorus compounds are for example organic phosphates, phosphites, phosphonates, phosphinates and phosphine oxides.

Preferably, phosphates, phosphonates or phosphinates are chosen. Examples of such phosphorus compounds are described in for example the "Encyclopedia of Chemical Technology", Vol. 10, p. 396 ff. (1980). Many are commercially available, for example resorcinol-bis(diphenylphosphate) oligomer, under the trade name Fyrolflex® RDP from AKZO-Nobel, NL; cresyl-diphenylphosphate (CDP) under the trade name Kronitex® CDP from FMC, UK; trimethylolpropanol ester of methyl phosphoric acid, under the trade name Amgard P45 from Albright and Wilson, USA; trimethylolpropanol ester of methylphosphonic acid, under the trade name Antiblaze® 1045 from Albright & Wilson, USA; polypentaerythritol phosphonate under the trade name Cyagard® RF 1041 from American Cyanamid, USA; Hostaflam® OP 910, a mixture of cyclic di- and triphosphonates from Clariant, Germany.

Preferably, a phosphorus compound with a low volatility is chosen as the flame retardant. It is also advantageous to use an organic phosphorus compound with a phosphorus content of at least 14 wt. %, preferably at least 18 wt. %. Examples of such organic phosphorus compounds with a phosphorus content of at least 14 weight % are Amgard-P45 and the metal phosphinates as for instance in U.S. Pat. No. 4,208,321 and U.S. Pat. No. 3,594,347.

In another preferred mode of the invention, the process is carried out with a halogenated organic compound as the flame retardant is. With this process, polyamide compounds with reduced discoloration can be prepared compared to the process with the same flame retardants and without a polyamide oligomer. Furthermore, the resulting compounds show a good strand quality upon extrusion of the melt after mixing, even when the process is carried out at higher screw speed.

Suitable for use as the halogen-containing system are for example systems that contain halogen-containing flame retardants as the flame retardant, for example brominated polystyrene, for example Pyrochek® 68PB and Saytex® HP7010, both from Albemarle (USA), brominated polyphenylene ether, for example PO64P® from Great Lakes (USA), polydibromostyrene, for example PDBS80® from Great Lakes, polytribromostyrene, polypentabromostyrene, polydichlorostyrene, polytrichlorostyrene, polypentachlorostyrene, polytribromo-alpha-methylstyrene, polydibromo-p-phenylene oxide, polytribromo-p-phenylene oxide, polydichloro-p-phenylene oxide, polybromo-p-phenylene oxide, polybromo-o-phenylene oxide, pentabromobenzyl acrylate, for example FR1025® from AmeriBrom (USA), ethylene bis-tetrabromo-phtalimide, for example Saytex® BT-93W from Albemarle (USA), polybromobiphenyl, brominated phenoxy- and chlorine-containing flame retardants such as DeChlorane® (Occidental Chemical Corporation, USA) and other brominated compounds such as Saytex®8010 from Albemarle (USA).

In the process according to the invention, also combinations of different flame retardants may be used. Suitable combinations are for example combinations of nitrogen-containing flame retardants and phosphorous containing flame retardants, like melamine condensation products combined with phosphorous compounds chosen from the group consisting of organic phosphates, phosphates, phosphonates and phosphinates. Also combinations of halogen-free and halogen containing flame retardants may be used. A person skilled in the art will be able to select the optimal combination for his own purposes.

In the flame-retardant compounds prepared by the process according to the invention the flame retardant is used in an amount between 1 and 100 parts by weight, relative to a total amount of polyamide of 100 parts by weight. Preferably, the amount is at least 10 parts by weight, more preferably at least 20 parts by weight and most preferably at least 30 parts by weight, relative to the total amount of polyamide of 100 parts by weight. A higher minimum amount of flame retardant is advantageously applied in compounds having a higher flame retardancy performance.

Also preferably, the amount of flame retardant is at most 90 parts by weight, more preferably at most 85 parts by weight and most preferably at most 80 parts by weight, relative to the total amount of polyamide of 100 parts by weight. A lower minimum amount of flame retardant is advantageously applied in compounds having an increased toughness and impact resistance. The optimal amount can in principle be determined experimentally by a person skilled in the art of formulating polyamide compounds through systematic research.

In the process according to the invention, next to the flame retardant also a synergist may be used. Suitable synergists are:

antimony-containing compounds, for example antimony trioxide, for example Bluestar® RG (Campine, Belgium), antimony tetraoxide, antimony pentoxide, potassium antimonite, sodium antimonate, for example Pyrobloc® SAP-2 (Cookson Specialty Additives), antimony tartrate;

Group IIA and IIB metal borates, like zinc borate, for example Firebrake® ZB (Borax Inc., USA)

magnesium hydroxide, aluminium hydroxide, iron oxide, zinc oxide, calcium oxide and analogous substances.

In particular, the halogen-containing flame retardants are typically used in combination with an antimony-containing compound.

Other substances that promote the flame retardancy may optionally also be added, for example carbon-forming substances such as polyphenylene ether and polycarbonate and substances modifying the dripping behaviour, for example fluoropolymers such as polytetrafluoroethylene.

Also components may be added which function as an anti-drip components. Suitable anti-drip components are, for example, polymers prepared from monomers comprising at least an ethylenically unsaturated monomer and at least a carboxylic acid containing monomer. Preferably, the monomers comprise ethylene as the ethylenically unsaturated monomer.

The composition melt-mixed with the process according to the invention may also contain other additives known to a person skilled in the art that are customarily used in polymer compounds, providing they do not essentially detract from the invention, in particular fillers, pigments, processing aids, for example mould release agents, agents accelerating crystallization, nucleating agents, lubricants, softeners, UV and heat stabilizers and the like. In particular, the composition according to the invention contains an inorganic filler or reinforcing agent. Suitable for use as an inorganic filler or reinforcing agent are all the fillers known to a person skilled in the art. Suitable reinforcing agents are, for example glass fibres, metal fibres, graphite fibres, aramide fibres, glass beads, aluminium silicates, asbestos, mica, clay, calcined clay and talcum.

The process according to the invention is in particular advantageously applied for preparing a flame retardant polyamide compound comprising a reinforcing agent. Preparation of a flame retardant polyamide compound comprising a reinforcing agent generally suffers even more from deterioration of the flame retardant, or the negative effects thereof upon the properties of the polyamide compound, than non-reinforced compounds. With the process according to the invention flame retardant reinforced polyamide compounds can be prepared that show a substantially reduced negative effect of the flame retardant on the mechanical properties of the compound.

Preferably, glass fibres are chosen as the reinforcing agent. With the process according to the invention, also compounds with higher glass content, without a noticeable effect on the flame retardant and without significant decline in flame retardant properties, can be prepared.

The process according to the invention can be carried out in a melt-mixing apparatus, for which any melt-mixing apparatus known to the man skilled in the art of preparing polymer compounds by melt-mixing can be used. Suitable melt-mixing apparatus are, for example, kneaders, Banburry mixers, single screw extruders and double screw extruders. Melt-mixing is typically performed at a processing temperature, which is above the melting temperature of the high molecular weight polyamide, thereby forming a polymer melt. In the process according to the invention for the preparation of a polyamide compound, comprising polyamide polymer, polyamide oligomer and flame retardant as constituting components amongst possible other constituting components, the constituting components are fed to a melt-mixing apparatus and melt-mixed in that apparatus. The constituting components may be fed simultaneously as a powder mixture or granule mixer, also known-as dry-blend, or may be fed separately. If fed separately, preferably the polyamide components, i.e. the polymer and the oligomer, are first fed and melted, and than the flame retardant is added to and mixed with the polymer melt. This has the advantage that the exposure of the flame retardant to high temperature and high shear is limited and less deterioration occurs, resulting in further improved flame retardancy or colour retention. Polyamide polymer and polyamide oligomer may also be fed separately.

The invention also relates to a flame retardant polyamide compound comprising a polyamide polymer having a weight-average molecular weight of at least 10.000 g/mol and a flame retardant, wherein the compound comprises an amount of 0.1-30 wt. %, relative to the total weight of polyamide, of a polyamide derived from a polyamide oligomer with a molecular weight below 7500 g/mol, with the proviso that the compound does not consist of:

i) 100 parts by weight of a polyamide polymer, 0.001-10 parts by weight of a polyamide oligomer with a molecular weight of 5000 or less and having hydrocarbon radicals with 5-30 carbons as the terminals, and 1-25 parts by weight of a triazine flame retardant;

ii) 100 parts by weight of a polyamide-6,6 polymer, 15 parts by weight of a polyamide oligomer with a molecular weight of 1000 and consisting of the condensation product of stearic acid, ethylenediamine, and sebacic acid, and 7 parts by weight of melamine cyanuric acid; or iii) 100 parts by weight of a polyamide-6 polymer, 0.5 parts by weight of a polyamide oligomer with a molecular weight of 1200 and consisting of the condensation product of stearyl amine, ethylenediamine, and sebacic acid, and 27 parts by weight of melamine cyanuric acid.

The polyamide compound according to the invention has the advantages of the products obtained by the inventive process reported above.

Typically, the polyamide compound according to the invention consists of:

a) 70-99.9 parts by weight of a polyamide polymer having a weight-average molecular weight of at least 10.000 g/mol
b) 0.1-30 parts by weight of a polyamide oligomer having a molecular weight of at most 7500 g/mol, whereby the total amount of a)+b) is 100 parts by weight c) 1-100 parts by weight of a flame retardant
d) 0-50 parts by weight of a reinforcing agent
e) 0-25 parts by weight of at least one other component.

Preferred embodiments of the inventive polyamide compound directly relate to the preferred embodiments of the process according to the invention described above.

The invention also relates to the use of a flame retardant polyamide compound according to the invention for preparing a molded part. The advantage is that processing of the compound can be done at lower processing temperatures and/or lower pressure than corresponding compounds without a polyamide oligomer. Furthermore, parts prepared from compounds comprising an organic halogen-free flame retardant, have a better flame retardancy and improved mechanical properties, whereas parts comprising a halogenated organic compound as the flame retardant show reduced discoloration.

The invention will now be elucidated with reference to the following examples, but is not limited thereto.

| Materials | |
|---|---|
| PP-A | Polyamide polymer: Stanyl ® KS200 (ex DSM, The Netherlands): Polyamide-4,6 polymer, Mw = 36000, viscosity number (formic acid) = 160; $T_{melt}$ = 295° C. |
| PO-A | Polyamide oligomer: (ex DSM, The Netherlands): $M_w$ = 2,000, $T_{melt}$ = 288° C. |
| MPP-200 | Melamine polyphosphate: Melapur 200 (ex DSM, The Netherlands): nitrogen content 42-44 wt. %; phosphor content 12-14 wt. %. |
| PMP-100 | Melamine polyphosphate; (Nissan Chemical Industries Ltd); phosphor content 14.5 wt. %. |
| Glass fibres | Standard glass fibres for polyamide compounds; average fiber diameter 10 μm. |
| FR-BR | Brominated polystyrene: Pyrocheck 68PBC (ex Albemarle); Br content 68 wt. %. |
| Sb2O3-MB | Antimone trioxide: Antiox GR 2617 (ex Campine); 80% masterbatch in polyamide-6. |

Determination of the Physical Properties

Viscosity number: determined in acetic acid, according to ISO 307.

Tensile strength: determined at 23° C. and 5 mm/min, according to ISO 527

Elongation at break: determined at 23° C. and 5 mm/min, according to ISO 527

Notched Izod: determined at 23° C. according to ISO 180/1A

Molecular weight: determined with the aid of standard GPC techniques

Melting point: determined with the aid of DSC (2nd run, 10° C./min.).

Flame retardancy: determined according Underwriters Laboratories test method UL 94, using 0.8 mm test bars, conditioned for 48 hours at 23° C., 50% relative humidity, respectively for 168 hours at 70° C.

Bulk density: determined according ASTM D 1895-96 Test Method A.

Preparation of Polyamide Compounds

EXAMPLE I AND COMPARATIVE EXPERIMENT A

Polyamide compounds according Example I, comprising a combination of PP-A and PO-A, and Comparative Experiment A, only comprising PP-A as the polyamide, both comprising 30 weight % of MPP-200, relative to the total weight of the compound (see Table I) were prepared by melt-mixing the constituent components on a Werner & Pfleiderer ZSK-40 twin screw extruder using a 300° C. flat temperature profile. The constituents were fed via a hopper, glass fibers were added via a side feed. Throughput was 60 kg/h and screw speed was 250 rpm. The polymer melt was degassed at the end of the extruder. The melt was extruded into strands, cooled and chopped into granules.

The granules were injection moulded into test bars according to ISO 527/1A multipurpose specimens and UL 94 test bars of 0.8 mm thick. The test bars were used to measure the flame retardant properties and mechanical properties of the compounds, the results of which have been reported in Table I.

TABLE I

Composition and results for Example I and Comparative Experiment A

|  | Comparative Experiment A | Example I |
|---|---|---|
| Components(weight %): |  |  |
| PP-A | 40 | 34 |
| PO-A | — | 6 |
| MPP-200 | 30 | 30 |
| Glass fibre | 30 | 30 |
| Throughput in kg/h | 60 | 60 |
| Strand formation | Very bad | o.k. |
| Notched Izod (kJ/m$^2$) | 8.6 | 9.0 |
| Tensile strength (MPa) | 101 | 110 |
| Elongation at break (%) | 0.8 | 1.0 |
| UL 94 V flammability properties: |  |  |
| 0.8 mm, 70° C./168 h |  |  |
| V0-Classification: | 100% | 100% |
| Total burning time | 23 | 21 |
| 0.8 mm, 23° C./50% RH/48 h |  |  |
| V0-Classification | 100% | 100% |
| Total burning time | 19 | 10 |

EXAMPLE II AND COMPARATIVE EXPERIMENT B

Example II and Comparative Experiment B represent compounds similar to Example I and Comparative Experiment A, except that PMP-100 was used as the flame retardant. The processing conditions, applied for the preparation of the compounds, were the same as for Example I and Comparative Experiment. The test results obtained from injection-molded parts prepared from respective granulates have been collected in Table II.

TABLE II

Composition and results for Example II and Comparative Experiment B

|  | Comparative Experiment B | Example II |
|---|---|---|
| Components(weight %): |  |  |
| PP-A | 40 | 34 |
| PO-A | — | 6 |
| PMP-100 | 30 | 30 |
| Glass fibre | 30 | 30 |
| Throughput (kg/h) | 60 | 60 |
| Strand formation | o.k. | o.k. |
| Tensile strength (MPa) | 109 | 134 |
| Elongation at break (%) | 1.0 | 1.3 |
| UL 94 V flammability properties: |  |  |
| 0.8 mm, 70° C./168 h |  |  |
| V0-classification: | 80% | 100% |
| Total burning time (sec) | 47 | 34 |
| 0.8 mm, 23° C./50% RH/48 h |  |  |
| V0-classification | 0% | 60% |
| Total burning time (sec) | 90 | 45 |

EXAMPLES III-VIII AND COMPARATIVE EXPERIMENT C-D

Examples III-VIII and Comparative Experiment C-D represent polyamide compounds with a halogenated flame retardant system based on FR-68 and Sb2O3, further comprising regular glass fibres, stabilizers and a lubricant as additives. Comparative Experiments C-D comprise only PP-A as the polyamide, whereas Examples III-VIII comprise a combination of PP-A and PO-A, with different levels of PO-A. Furthermore, the compounds were prepared on a Berstdorf ZE-40 twin-screw extruder at similar temperature settings (flat profile 300° C.) and 175 kg/h throughput and at two levels of screw speed. The quality of the resulting extrudates was measured in terms of strand quality, colour and bulk density of the pellets. For the respective compounds, process conditions and results see Table III.

TABLE IV

| Components (weight %): | CE-C | CD-D | Ex-III | Ex-IV | Ex-V | Ex-VI | Ex-VII |
|---|---|---|---|---|---|---|---|
| PP-A | 42.74 | 42.74 | 38.74 | 38.74 | 40.74 | 40.74 | 41.74 |
| PO-A | — | — | 4 | 4 | 2 | 2 | 1 |
| FR-BR | 18.75 | 18.75 | 18.75 | 18.75 | 18.75 | 18.75 | 18.75 |
| Sb2O3 | 7.81 | 7.81 | 7.81 | 7.81 | 7.81 | 7.81 | 7.81 |
| Additives | 0.7 | 0.7 | 0.7 | 0.7 | 0.7 | 0.7 | 0.7 |
| Glass fibre | 30 | 30 | 30 | 30 | 30 | 30 | 30 |
| Screw speed (rpm) | 300 | 600 | 300 | 600 | 300 | 600 | 600 |
| Strand quality | o.k. | Irregular, swollen | o.k. | o.k. | o.k. | o.k. | o.k. |

TABLE IV-continued

| Components (weight %): | CE-C | CD-D | Ex-III | Ex-IV | Ex-V | Ex-VI | Ex-VII |
|---|---|---|---|---|---|---|---|
| Strand colour | Beige | Dark beige/grey | Beige | Beige | Beige | Beige | Beige |
| Bulk density (g/cm3) | 0.67 | 0.40 | 0.67 | 0.67 | 0.71 | 0.65 | 0.5 |

The invention claimed is:

1. Process for preparing a flame retardant polyamide compound comprising melt-mixing of a composition comprising at least a polyamide polymer having a weight-average molecular weight of at least 10.000 g/mol and a flame retardant, wherein the composition comprises an amount of 1-20 wt %, relative to the total weight of polyamide, of a polyamide oligomer having (1) a weight-average molecular weight of at most 7.500 g/mol, and (2) a lower melting point than the polyamide polymer, with the proviso that the composition that is melt-mixed does not consist of:
   i) 100 parts by weight of a polyamide polymer, 0.001-10 parts by weight of a polyamide oligomer with a molecular weight of 5000 or less and having hydrocarbon radicals with 5-30 carbons as the terminals, and 1-25 parts by weight of a triazine flame retardant;
   ii) 100 parts by weight of a polyamide-6, 6 polymer, 15 parts by weight of a polyamide oligomer with a molecular weight of 1000 and consisting of the condensation product of stearic acid, ethylenediamine, and sebacic acid, and 7 parts by weight of melamine cyanuric acid; or
   iii) 100 parts by weight of a polyamide-6 polymer, 0.5 parts by weight of polyamide oligomer with a molecular weight of 1200 and consisting of the condensation product of stearyl amine, ethylenediamine, and sebacic acid, and 27 parts by weight melamine cyanuric acid.

2. Process according to claim 1, wherein the polyamide polymer is a polyamide with a melting temperature of at least 260° C.

3. Process according to claim 1, wherein the polyamide oligomer is a polyamide with a melting temperature of at least 260° C.

4. Process according to claim 1, wherein the flame retardant is halogen-free flame retardant.

5. Process according to claim 1, wherein the flame retardant is a halogenated organic compound.

6. Process according to claim 1, wherein the polyamide composition comprises a reinforcing component.

7. Flame retardant polyamide composition comprising a polyamide polymer having a weight-average molecular weight of at least 10.000 g/mol and a an amount of 1-100 wt. %, relative to the total weight of polyamide, of a flame retardant, wherein the composition comprises an amount of 1-20 wt. %, relative to the total weight of polyamide, of a polyamide derived from a polyamide oligomer having (1) a molecular weight of at most 7500 g/mol, and (2) a lower melting point than the polyamide polymer, with the proviso that the composition does not consist of:
   i) 100 parts by weight of a polyamide polymer, 0.001-10 parts by weight of a polyamide oligomer with a molecular weight of 5000 or less and having hydrocarbon radicals with 5-30 carbons as the terminals, and 1-25 parts by weight of a triazine flame retardant;
   ii) 100 parts by weight of a polyamide-6, 6 polymer, 15 parts by weight of a polyamide oligomer with a molecular weight of 1000 and consisting of the condensation product of stearic acid, ethylenediamine, and sebacic acid, and 7 parts by weight of melamine cyanuric acid; or
   iii) 100 parts by weight of a polyamide-6 polymer, 0.5 parts by weight of polyamide oligomer with a molecular weight of 1200 and consisting of the condensation product of stearyl amine, ethylenediamine, and sebacic acid, and 27 parts by weight melamine cyanuric acid.

8. A molded part comprising a polyamide composition according to claim 7.

9. Process according to claim 1, wherein the composition comprises an amount of 2-15 wt % of the polyamide oligomer relative to the total weight of polyamide.

10. A flame-retardant composition according to claim 7, wherein the composition comprises an amount of 2-15 wt % of the polyamide oligomer relative to the total weight of polyamide.

* * * * *